United States Patent
Goto

(10) Patent No.: US 12,008,189 B2
(45) Date of Patent: Jun. 11, 2024

(54) SENSOR MODULE AND TOUCH PANEL INCLUDING THE SAME

(71) Applicant: Japan Display Inc., Tokyo (JP)

(72) Inventor: Naoshi Goto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/242,979

(22) Filed: Sep. 6, 2023

(65) Prior Publication Data

US 2023/0409137 A1 Dec. 21, 2023

Related U.S. Application Data

(63) Continuation of application No. PCT/JP2022/004175, filed on Feb. 3, 2022.

(30) Foreign Application Priority Data

Mar. 12, 2021 (JP) .................................. 2021-040519

(51) Int. Cl.
G06F 3/044 (2006.01)
G02F 1/1333 (2006.01)
G02F 1/1335 (2006.01)
G06F 3/041 (2006.01)
G06F 3/042 (2006.01)

(52) U.S. Cl.
CPC ........ G06F 3/0416 (2013.01); G02F 1/13338 (2013.01); G02F 1/133512 (2013.01); G06F 3/0446 (2019.05); G06F 2203/04107 (2013.01)

(58) Field of Classification Search
CPC .. G06F 3/0416; G06F 3/0446; G02F 1/13338; G02F 1/133512
See application file for complete search history.

(56) References Cited

U.S. PATENT DOCUMENTS

| 2013/0293490 | A1* | 11/2013 | Ward | G06F 3/0488 |
| | | | | 345/173 |
| 2015/0370334 | A1* | 12/2015 | Joo | G06F 3/017 |
| | | | | 345/156 |
| 2016/0357317 | A1* | 12/2016 | Kim | G06F 3/04166 |

FOREIGN PATENT DOCUMENTS

| JP | 2000-280896 A | 10/2000 |
| JP | 2011-113489 A | 6/2011 |

(Continued)

OTHER PUBLICATIONS

International Search Report and English Translation from International Patent Application No. PCT/JP2022/004175 mailed on Apr. 19, 2022. 5 pages.

(Continued)

*Primary Examiner* — Sanghyuk Park
(74) *Attorney, Agent, or Firm* — K&L Gates LLP

(57) ABSTRACT

A sensor module comprises a non-contact sensor array having a plurality of sensors, a control unit configured to receive a detection signal output from the non-contact sensor array and to generate coordinate information based on the detection signal, a drive unit configured to receive the coordinate information from the control unit and to output a drive signal based on the coordinate information, and a light shielding panel overlapping the non-contact sensor array, the light shielding panel configured to be driven based on the drive signal, wherein the light shielding panel is switchable between blocking and transmitting light traveling in a direction parallel to a main surface of the non-contact sensor array.

18 Claims, 7 Drawing Sheets

(56) References Cited

FOREIGN PATENT DOCUMENTS

JP     2014-075022 A     4/2014
JP     2014-182657 A     9/2014

OTHER PUBLICATIONS

Written Opinion from International Patent Application No. PCT/JP2022/004175 mailed on Apr. 19, 2022. 4 pages.

* cited by examiner

SENSOR MODULE AND TOUCH PANEL INCLUDING THE SAME

CROSS-REFERENCE TO RELATED APPLICATIONS

This application is a Continuation of International Patent Application No. PCT/JP2022/004175, filed on Feb. 3, 2022, which claims the benefit of priority to Japanese Patent Application No. 2021-040519, filed on Mar. 12, 2021, the entire contents of which are incorporated herein by reference.

FIELD

An embodiment of the present disclosure relates to a sensor module and a touch panel including the sensor module. In particular, the present invention relates to a sensor module including a hover sensor and a touch panel including the sensor module.

BACKGROUND

Conventionally, a touch panel including a touch sensor on a display panel such as a liquid crystal panel has been put into practical use. The touch panel can be operated by touching a surface of the touch panel with a finger, a pen, or the like. The touch panel is mounted on an ATM (automatic teller machine), an automatic payment machine, a ticket vending machine, or the like. In the case where the touch panel is operated with a finger, an unspecified number of users directly touch the touch panel with the fingertip. Therefore, there is a possibility that contact infection of bacteria, viruses, and the like may occur through the touch panel, and there is a problem in terms of hygiene.

In order to solve such a problem, for example, Japanese laid-open patent publication No. 2011-113489 discloses a non-contact type user interface in which a non-contact sensor is arranged on a real image display surface in which displayed images are raised.

SUMMARY

A sensor module according to an embodiment of the present disclosure comprises a non-contact sensor array having a plurality of sensors, a control unit configured to receive a detection signal output from the non-contact sensor array and to generate coordinate information based on the detection signal, a drive unit configured to receive the coordinate information from the control unit and to output a drive signal based on the coordinate information, and a light shielding panel overlapping the non-contact sensor array, the light shielding panel configured to be driven based on the drive signal. The light shielding panel is switchable between blocking and transmitting light traveling in a direction parallel to a main surface of the non-contact sensor array.

A touch panel according to an embodiment of the present disclosure comprises a first sensor module and a second sensor module arranged adjacent to the first sensor module. The first sensor module includes a non-contact sensor array having a plurality of sensors, a control unit configured to receive a detection signal output from the non-contact sensor array and to generate coordinate information based on the detection signal, a drive unit configured to receive the coordinate information from the control unit and to output a drive signal based on the coordinate information, and a light shielding panel configured to be driven based on the drive signal. The second sensor module includes a substrate, a light emitting unit arranged on the substrate, and a light receiving unit arranged on the substrate and facing the light emitting unit. The light shielding panel of the first sensor module is arranged between the light emitting unit and the light receiving unit of the second sensor module.

A touch panel according to an embodiment of the present disclosure comprises a first sensor module and a second sensor module arranged adjacent to the first sensor module. The first sensor module includes a non-contact sensor array having a plurality of sensors, and a first light shielding panel overlapping the non-contact sensor array and switchable between blocking and transmitting a first light traveling in a direction parallel to a main surface of the non-contact sensor array. The second sensor module includes a substrate, a first light emitting unit arranged on the substrate, and a first light receiving unit arranged on the substrate and facing the first light emitting unit. The first light shielding panel is arranged between the first light emitting unit and the first light receiving unit of the second sensor module.

DESCRIPTION OF EMBODIMENTS

Figure 1:
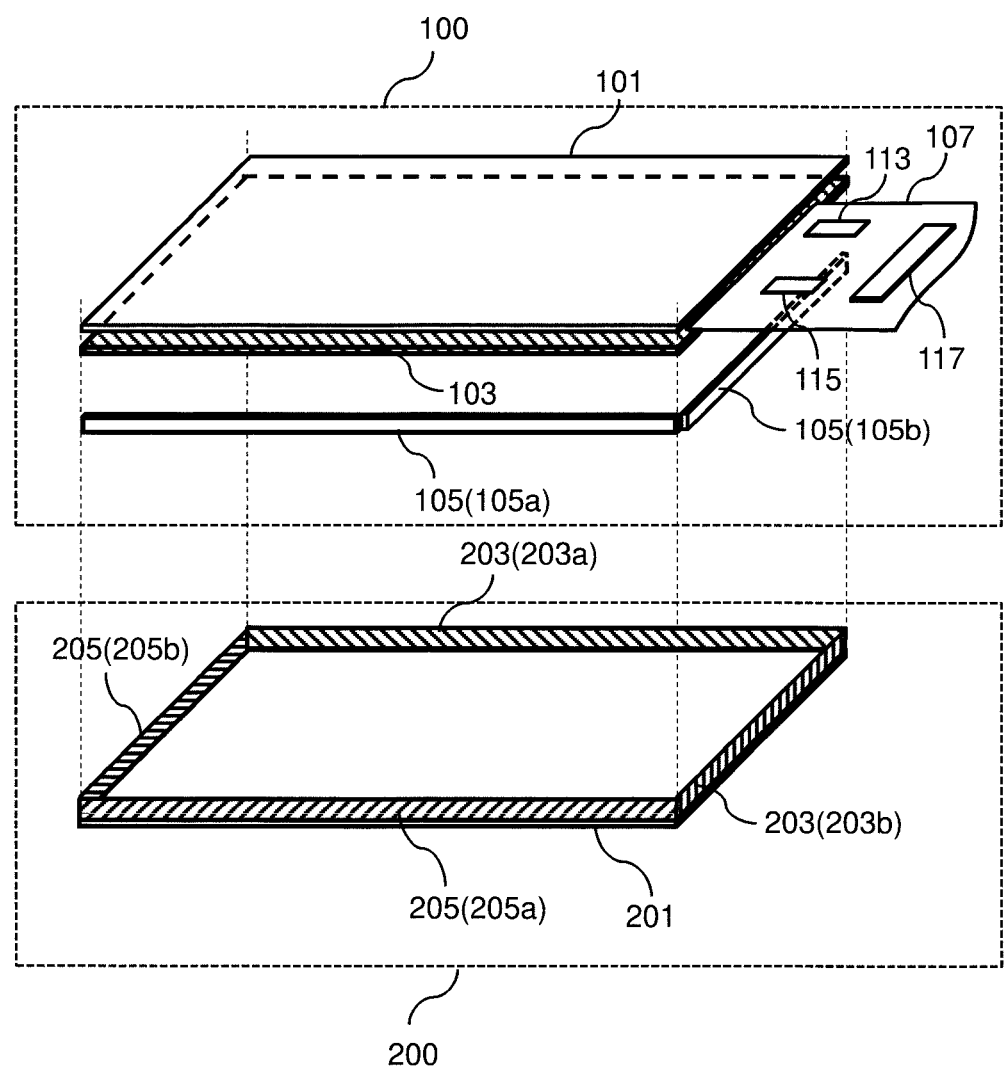
FIG. 1 is a schematic view showing an example of a configuration of a touch panel according to an embodiment.

In the non-contact type user interface described in Japanese laid-open patent publication No. 2011-113489, a display unit is used which can show the display images as if they were floating on a display panel. Therefore, in the case where the non-contact type user interface described in Japanese laid-open patent publication No. 2011-113489 is applied to an existing touch panel applied to an ATM, an automatic payment machine, a ticket vending machine, or the like, there is a need to replace an existing system or change the equipment constituting the display unit.

In addition, in order to operate the non-contact type user interface described in Japanese laid-open patent publication No. 2011-113489, an object to be detected must be brought close to a region irradiated with infrared light for touch detection, so there is a possibility that the object to be detected may erroneously come into contact with the display panel.

An embodiment of the present disclosure provides a non-contact touch panel that can be easily applied to existing systems.

Hereinafter, embodiments of the present disclosure will be described with reference to the figures and the like. However, the present disclosure can be implemented in various forms without departing from the gist thereof. The present disclosure is not to be construed as being limited to the description of the embodiments illustrated below. In the figures, the widths, thicknesses, shapes, and the like of the respective portions may be schematically represented in comparison with actual embodiments for clarity of explanation. However, the figures are merely examples, and do not limit the interpretation of the present disclosure.

In describing embodiments of the present disclosure, the phrases "on" or "under" merely describe relative positional relationships of elements. For example, the expression that a first component is arranged "on" a second component includes not only the case where the first component is "directly on" the second component, but also the case where another component is interposed between the first component and the second component. Furthermore, the terms "on" or "under" include not only the case where the elements in a plan view overlap, but also the case where they do not overlap.

In the present specification, the expression "α includes A, B, or C," "α includes any of A, B, and C," and "α includes one selected from a group consisting of A, B, and C," does not exclude the case where a includes a plurality of combinations of A to C unless otherwise specified. Furthermore, these expressions do not exclude the case where a includes other elements.

In describing the embodiments of the present disclosure, elements having the same functions as those described above may be denoted by the same reference signs or the same reference signs with symbols such as letters of the alphabet, and description thereof may be omitted. For example, when there is a plurality of elements to which certain reference signs are attached in the figures, "a", "b", and the like may be attached to reference signs to distinguish them. On the other hand, when it is not necessary to distinguish each element, the description will be made using only the reference signs indicating the elements.

[Configuration of Touch Panel]

A configuration of a touch panel 10 according to an embodiment of the present disclosure will be described with reference to FIG. 1.

FIG. 1 is a schematic view showing an example of a configuration of the touch panel 10 according to an embodiment of the present disclosure. As shown in FIG. 1, the touch panel 10 includes a first sensor module 100 and a second sensor module 200.

Hereinafter, a configuration of the first sensor module 100 will be described with reference to FIG. 1 to FIG. 6. As shown in FIG. 1, the first sensor module 100 includes a cover member 101, a non-contact sensor array 103, a light shielding panel 105, and a circuit substrate 107. The circuit substrate 107 includes a first IC element 113, a second IC element 115, and a third IC element 117.

The cover member 101 may be a glass base material. However, the material of the cover member 101 is not limited to glass. For example, the cover member 101 may be composed of an insulating material capable of transmitting visible light, such as acrylic resin. The cover member 101 may be film-like.

Figure 2:
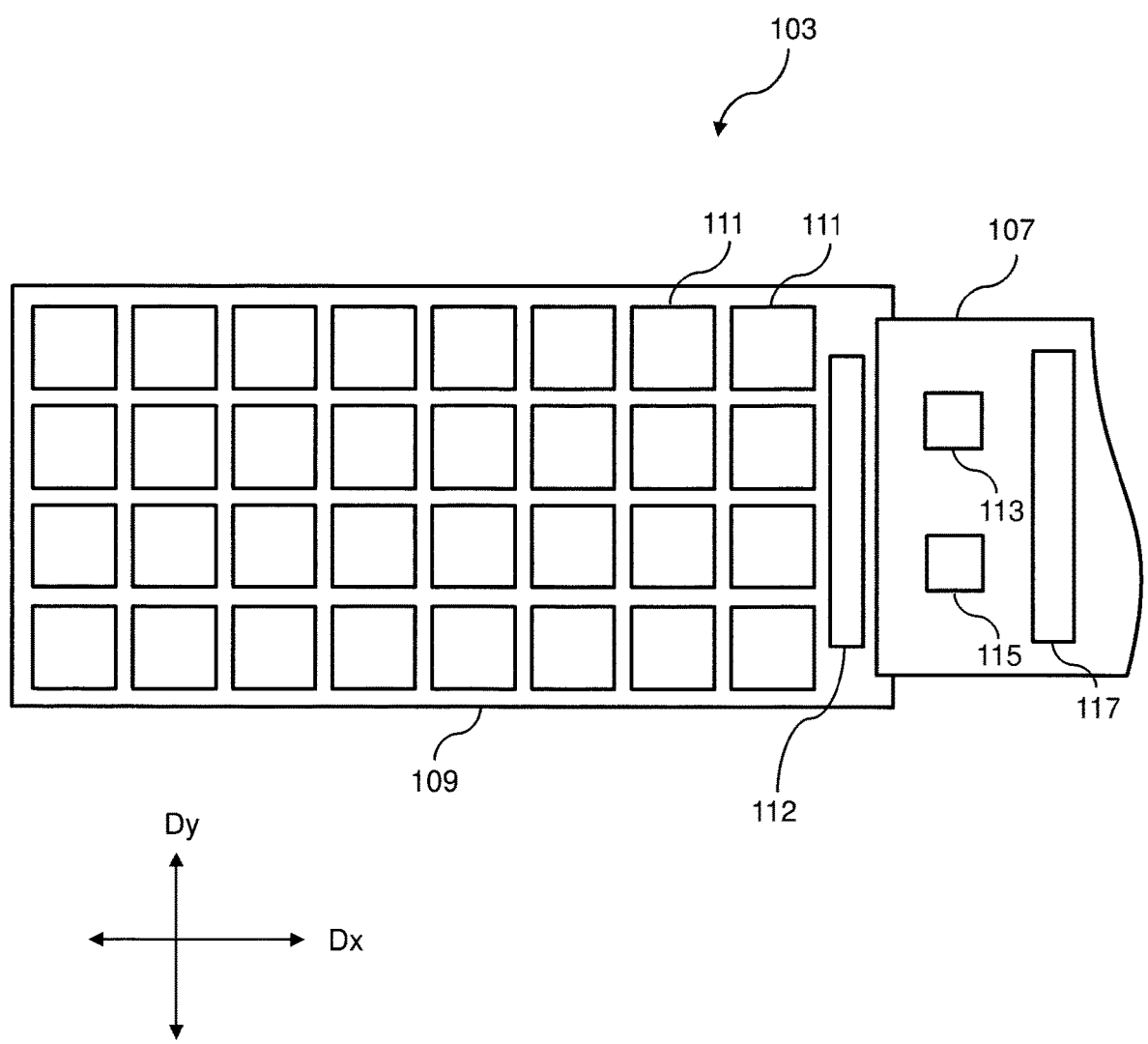
FIG. 2 is a plan view showing an example of a configuration of a non-contact sensor array according to an embodiment.

The non-contact sensor array 103 overlaps the cover member 101 and is arranged adjacent to the cover member 101. FIG. 2 is a plan view showing an example of a configuration of the non-contact sensor array 103. As shown in FIG. 2, the non-contact sensor array 103 includes a substrate 109 and a plurality of sensors 111. In addition, the non-contact sensor array 103 may include a voltage regulator circuit 112.

The substrate 109 is an insulating substrate. The substrate 109 may be the glass substrate. However, the substrate 109 is not limited to the glass substrate. The substrate 109 may be composed of an insulating material capable of transmitting visible light. Examples of such an insulating material include resin materials such as polyethylene terephthalate (PET), polyethylene naphthalate (PEN), polyethylene (PE), polypropylene (PP), polystyrene (PS), vinyl resin, polycarbonate (PC), polyamide (PA), polyimide (PI), polyvinyl alcohol (PVA), acryl resin, and triacetyl cellulose (TAC). Although the shape of the substrate 109 is not limited, the case where the substrate 109 has a rectangular shape having sides along a first direction Dx and a second direction Dy orthogonal to the first direction Dx will be described as an example.

The plurality of sensors 111 is formed on the substrate 109. As shown in FIG. 2, the plurality of sensors 111 are arranged in a matrix on the substrate 109 along the first direction Dx and the second direction Dy. FIG. 2 exemplarily shows a configuration in which the plurality of sensors 111 is arranged on the substrate 109 in a matrix of 4 rows×8 columns. However, the number and arrangement of sensors 111 are not limited to this.

The sensor 111 may be a rectangular planar pattern. For example, the size of the sensor 111 may be a rectangular shape of 28 mm×30 mm. However, the size of the sensor 111 is not limited to this. The sensitivity of the sensor 111 increases as the size of the sensor 111 increases. That is, as the size of the sensor 111 increases, the detection of the object to be detected separated from the non-contact sensor array 103 becomes possible. On the other hand, if the size of the sensor 111 is too large, the detection accuracy of the position of the detection object that is close to the non-contact sensor array 103 is reduced. Therefore, the size of the sensor 111 may be as long as it is capable of detecting the object to be detected separated from the non-contact sensor array 103 and is capable of specifying the position of the object to be detected that is close to the non-contact sensor array 103. In addition, in view of contact infections such as bacteria and viruses, the sensor 111 preferably has a size that can detect the object to be detected that is about 5 cm separate from the non-contact sensor array 103.

The sensor 111 is composed of an electrode. The electrode constituting the sensor 111 is composed of a transparent conductive material such as indium-tin-oxide (ITO: Indium Tin Oxide) or a conductive polymer such as PEDOT/PSS which is a thiophene-based polymer, or a metal material (mesh-layout) such as a thin metal wire. Two adjacent sensors 111 among the plurality of sensors 111 are electrically independent of each other.

Each of the plurality of sensors 111 is electrically connected to a power supply unit (not shown). The power supply unit periodically applies a predetermined voltage to the plurality of sensors 111. The voltage applied to each sensor 111 may be a pulse voltage (AC square wave). When a conductor (for example, a human finger or the like) which is an object to be detected approaches the sensor 111, a pseudo capacitor is formed between the electrode constituting the sensor 111 and the object to be detected. As a result, the capacitance of the electrode constituting the sensor 111 changes. The sensor 111 may output the change in capacitance of the electrode constituting the sensor 111 as a detection signal. Alternatively, the sensor 111 may output the magnitude of the capacitance of the electrode constituting the sensor 111 as a detection signal.

Although not shown, a plurality of wirings is arranged on the substrate 109. Each of the plurality of wirings transmits the detection signal output from the corresponding sensor 111 to the circuit substrate 107 to be described later. In the case where the non-contact sensor array 103 includes the voltage regulator circuit 112, the detection signal is first transmitted to the voltage regulator circuit 112 via the wiring connected to each wiring. The voltage regulator circuit 112 includes an operational amplifier (not shown). The voltage regulator circuit 112 amplifies the input detection signal. The amplified detection signal is output to the circuit substrate 107.

The light shielding panel 105 is a polymer-dispersed liquid crystal panel. The light shielding panel 105 includes a first light shielding panel 105a arranged along the first direction Dx and a second light shielding panel 105b arranged along the second direction Dy. Each of the first light shielding panel 105a and the second light shielding panel 105b is driven by a drive signal based on coordinate information indicating the position of the object to be detected. A detailed configuration of the light shielding panel 105 will be described later.

The circuit substrate 107 may be a flexible circuit (FPC) substrate. The first IC element 113, the second IC element 115, and the third IC element 117 are mounted on the circuit substrate 107.

Figure 3:
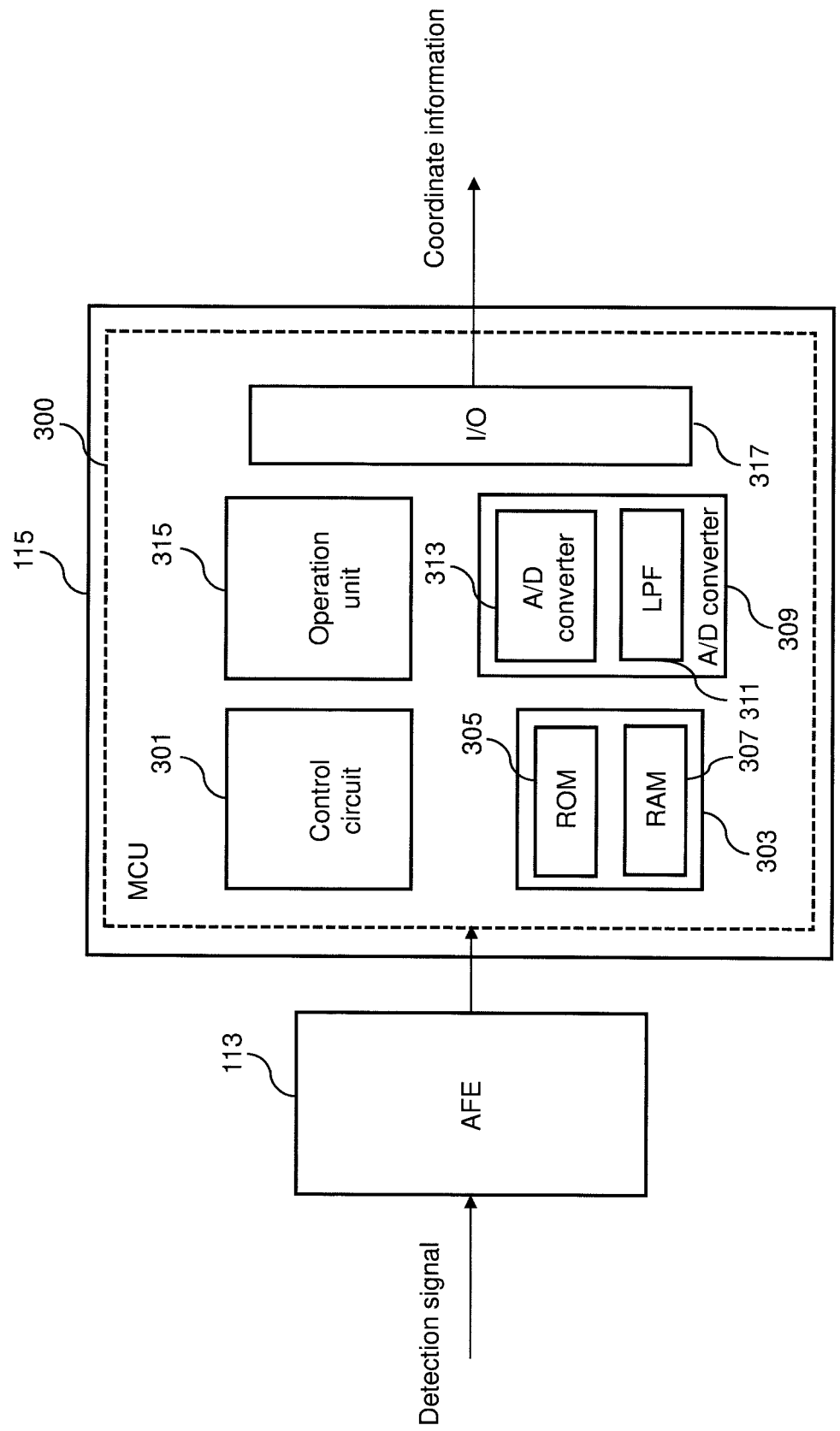
FIG. 3 is a block diagram showing an example of a configuration of a first IC element and a second IC element.

FIG. 3 is a block diagram showing an example of a configuration of the first IC element 113 and the second IC element 115. The configurations of the first IC element 113 and the second IC element 115 will be described with reference to FIG. 3.

The first IC element 113 may be an IC tip including an analog front end (AFE). The detection signal output from each of the plurality of sensors 111 arranged in the non-contact sensor array 103 is input to the first IC element 113. The detection signal input to the first IC element 113 is adjusted by the analog front end. The adjusted detection signal is output from the first IC element 113 to the second IC element 115 via a wiring (not shown).

The second IC element 115 may be a microcontroller unit (MCU). The MCU of the second IC element 115 constitutes a control unit 300. The control unit 300 includes a control circuit 301, a memory unit 303, an A/D converter 309, an operation unit 315, and an I/O interface 317.

The control circuit 301 executes a control program stored in a ROM 305, which will be described later, by a CPU, and realizes the function of generating coordinate information indicating the position of the object to be detected based on the detection signal output from the first IC element 113.

The memory unit 303 includes the ROM 305 and a RAM 307. The ROM 305 stores various types of computer programs executed by the control circuit 301, and various types of data referred to when the control circuit 301 executes a predetermined computer program, and the like in a readable manner. The RAM 307 is used as a working memory for temporarily storing various types of data generated when the control circuit 301 executes a predetermined computer program. In addition, the RAM 307 may also be used as a memory or the like to temporarily store running computer programs and their associated data.

The A/D converter 309 includes a low-pass filter (LPF) 311, and an A/D converter 313). The low-pass filter 311 removes a high-frequency component (noise component) contained in the detection signal. The A/D converter 313 samples the noise-removed analogue detection signal and converts it to a digital signal. The A/D converter 309 outputs the digitized detection signal to the operation unit 315.

The operation unit 315 may be a logical circuit that determines whether the object to be detected approaches the non-contact sensor array 103 and further determines the coordinate position of the object to be detected. The operation unit 315 determines whether the object to be detected approaches the non-contact sensor array 103 based on the digitized detection signal input from the A/D converter 309. In the case where the sensor 111 outputs the change in the capacitance of the electrode constituting the sensor 111 as the detection signal, the operation unit 315 determines that the object to be detected has approached the sensor 111 that has output the detection signal, and determines the position of the object to be detected on xy coordinates based on the position of the sensor 111 that has output the detection signal. The operation unit 315 generates coordinate information indicating the determined position of the object to be detected on xy coordinates. The coordinate information includes x-coordinate information (first coordinate information) and y-coordinate information (second coordinate information). The operation unit 315 transmits the coordinate information to the third IC element 117 via the I/O interface 317.

If the sensor 111 outputs the magnitude of the capacitance of the electrode constituting the sensor 111 as the detection signal, the operation unit 315 determines whether the magnitude of the detected capacitance has changed from the magnitude of the previously detected capacitance. As a result of the determination, when the magnitude of the detected capacitance changes from the magnitude of the previously detected capacitance to a predetermined change amount or more, the operation unit 315 determines that the object to be detected has approached the sensor 111 corresponding to the electrode whose capacitance has changed, and determines the position of the object to be detected on xy coordinates based on the position of the sensor 111 that has output the detection signal. In addition, when the detected capacitance does not differ from the previously detected capacitance, or even if the capacitance has changed, when the amount of change is less than the predetermined amount of change, the operation unit 315 determines that the object to be detected does not approach the sensor 111 corresponding to the electrode having the capacitance.

Figure 4:
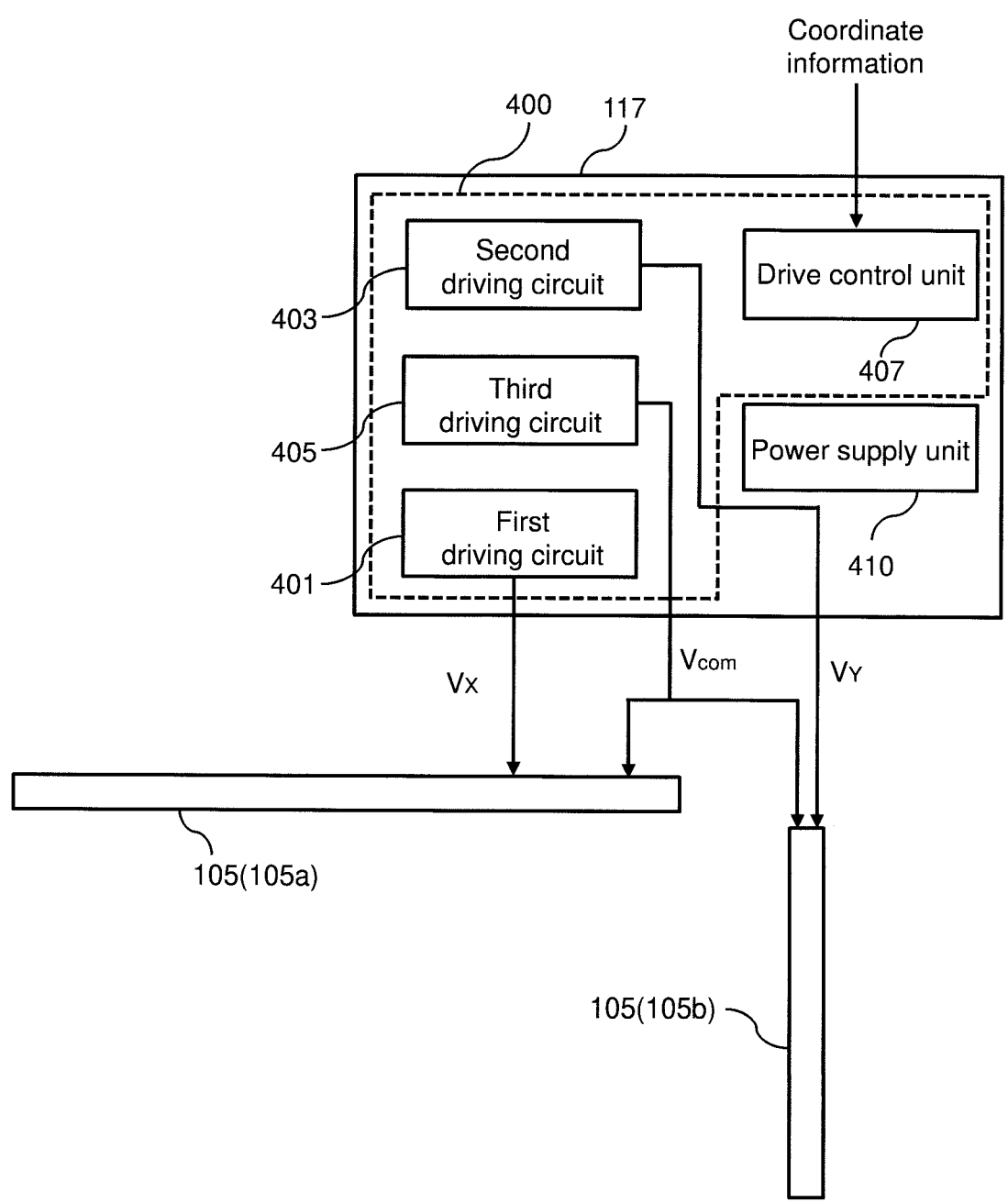
FIG. 4 is a block diagram showing an example of a configuration of a third IC element.

FIG. 4 is a block diagram showing an example of a configuration of the third IC element 117. The configuration of the third element 117 will be described with reference to FIG. 4. The third IC element 117 includes a drive unit 400 and a power supply unit 410.

The drive unit 400 generates a driving voltage (drive signal) for driving a light shielding panel 150, and outputs the generated driving voltage to the light shielding panel 150. The drive unit 400 includes a first driving circuit 401, a second driving circuit 403, a third driving circuit 405, and a drive control unit 407.

The drive control unit 407 receives the coordinate information from the control unit 300. The drive control unit 407 selects at least one electrode corresponding to the x-coordinate information from among the plurality of electrodes arranged in the first light shielding panel 105a based on the x-coordinate information included in the received coordinate information. In addition, the drive control unit 407 selects at least one electrode corresponding to the y-coordinate information from among the plurality of electrodes arranged in the second light shielding panel 105b based on the y-coordinate information included in the received coordinate information. The drive control unit 407 may have a table in which the x-coordinate information and each of the plurality of electrodes arranged on the first light shielding panel 105a are respectively associated with each other. The drive control unit 407 may select at least one electrode associated with the received x-coordinate information from a plurality of electrodes arranged on the first light shielding panel 105a by referring to this table. Similarly, the drive control unit 407 may have a table in which the y-coordinate information and each of the plurality of electrodes arranged on the second light shielding panel 105b are respectively associated with each other. The drive control unit 407 may select at least one electrode associated with the received y-coordinate information from the plurality of electrodes arranged on the second light shielding panel 105b by referring to this table. The drive control unit 407 outputs a drive control signal indicating the selected electrodes to the first driving circuit 401 and the second driving circuit 403.

The first driving circuit 401 generates a first driving voltage (first drive signal) VX for driving the first light shielding panel 105a, and outputs the generated first driving voltage VX to the first light shielding panel 105a. In this case, the first driving circuit 401 outputs the first driving voltage VX to at least one electrode selected from the plurality of electrodes arranged on the first light shielding panel 105a.

The second driving circuit 403 generates a second driving voltage (second drive signal) VY for driving the second light shielding panel 105b, and outputs the second driving voltage VY to the second light shielding panel 105b. In this case, the second driving circuit 403 outputs the second driving voltage VY to at least one electrode selected from the plurality of electrodes arranged on the second light shielding panel 105b.

The third driving circuit 405 generates a third driving voltage (third drive signal) $V_{com}$ for driving the first light shielding panel 105a and the second light shielding panel 105b, and supplies the third driving voltage $V_{com}$ to the first light shielding panel 105a and the second light shielding panel 105b. The third driving voltage $V_{com}$ is a voltage having a potential difference with respect to the first driving voltage VX and the second driving voltage VY.

The power supply unit 410 supplies various types of driving power for driving the drive unit 400 to the drive unit 400.

Figure 5:
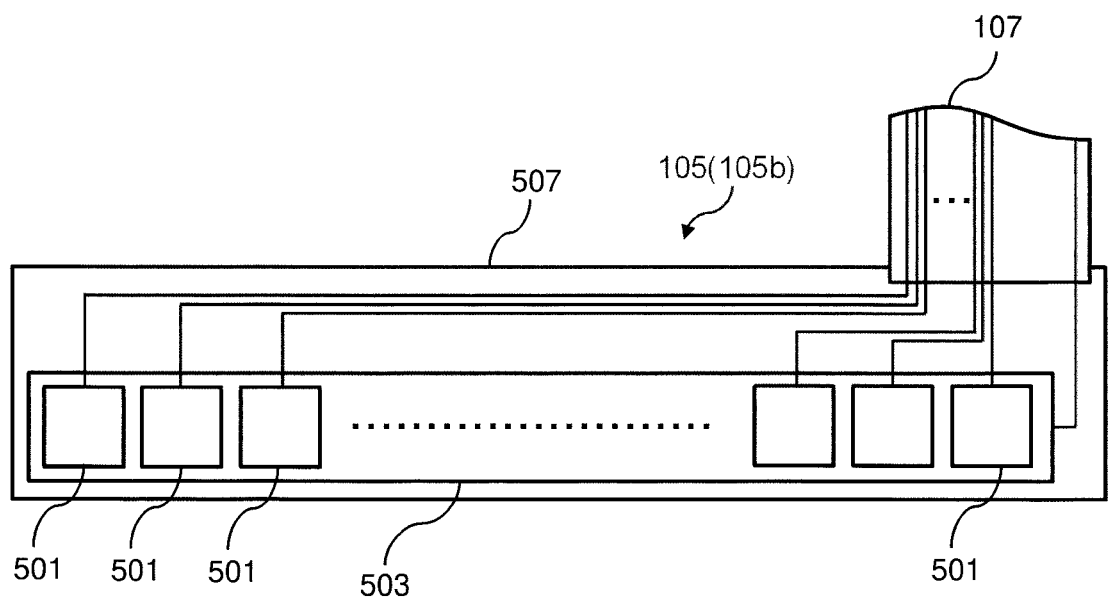
FIG. 5 is a plan view showing an example of a configuration of a second light shielding panel according to an embodiment.
Figure 6:
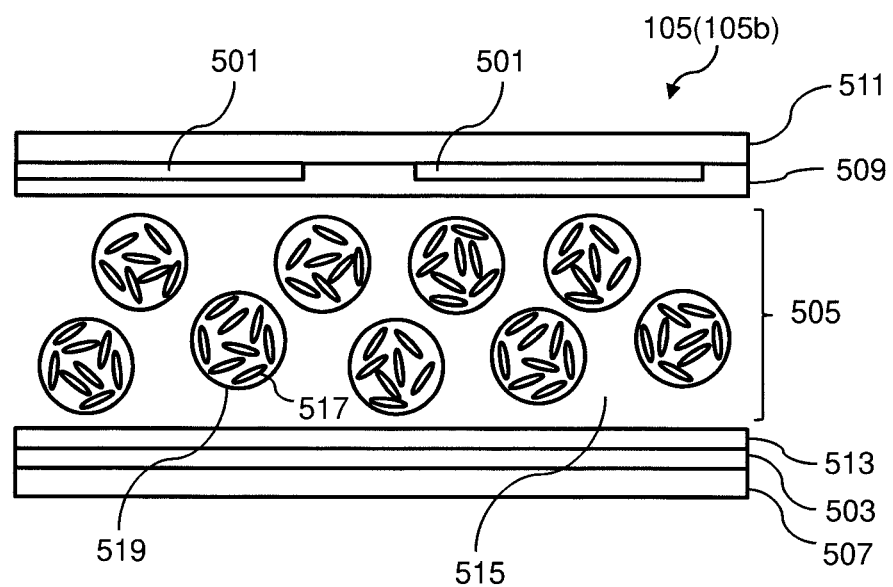
FIG. 6 is a cross-sectional view showing an example of a configuration of a second light shielding panel according to an embodiment.

A detailed configuration of the light shielding panel 105 will be described with reference to FIG. 5 and FIG. 6. FIG. 5 is a plan view showing an example of a configuration of the light blocking device 105. In addition, FIG. 5 shows a configuration of the second light shielding panel 105b as the light shielding panel 105. FIG. 6 is a cross-sectional view showing an example of a configuration of the second light shielding panel 105b. Since the configuration of the first light shielding panel 105a is substantially the same as the configuration of the second light shielding panel 105b shown in FIG. 5 and FIG. 6, illustration thereof is omitted and redundant explanation thereof is omitted.

The second light shielding panel 105b is a reverse-mode polymer dispersed liquid crystal (R-PDLC) panel. The second light shielding panel 105b includes a plurality of electrodes (second electrodes) 501, a counter electrode (second counter electrode) 503, a liquid crystal layer 505, and vertical alignment films 509 and 513.

The plurality of electrodes 501 is arranged on a substrate 511. The substrate 511 may be an insulating transparent substrate such as glass. In addition, the substrate 511 may be a transparent insulating substrate or film material containing a polyester resin such as polyethylene terephthalate (PET), polyethylene naphthalate (PEN), an acrylic resin such as polymethyl methacrylate (PMMA), a polyolefin resin such as polypropylene (PP), a cellulosic resin such as triacetyl cellulose (cellulose triacetate: TAC), a cycloolefin polymer (COP), a polycarbonate (PC) resin, or the like. Each of the plurality of electrodes 501 is composed of a transparent electrode such as ITO (Indium Tin Oxide), IZO (Indium Zinc Oxide), and the like. The plurality of electrodes 501 is arranged corresponding to a plurality of light emitting elements 701 arranged on a second light emitting unit 203b of the second sensor module 200 described later. The second driving voltage is applied from the second driving circuit 403 to at least one selected electrode 501 based on the y-coordinate information among the plurality of electrodes 501 via the wiring. The vertical alignment film 509 is arranged on a surface of the electrode 501 facing the counter electrode 503.

The counter electrode 503 faces the plurality of electrodes 501. The counter electrode 503 may be one common electrode that faces the plurality of electrodes 501. The counter electrode 503 is composed of a transparent material such as ITO, IZO. The counter electrode 503 may be arranged on a substrate 507, which is an insulating transparent substrate such as glass. In addition, the substrate 507 may be formed of the same resin material as the substrate 511. A wiring that is electrically connected to the electrode 501 is provided with the substrate 507. The third driving voltage $V_{com}$ is applied to the counter electrode 503 from the third driving circuit 405 via the wiring. For example, the third driving voltage $V_{com}$ may be 0 V. The vertical alignment film 513 is arranged on a surface of the counter electrode 503 facing the plurality of electrodes 501.

The liquid crystal layer 505 is arranged between the plurality of electrodes 501 and the counter electrode 503. In the liquid crystal layer 505, droplets 519 of a liquid crystal molecule 517 are dispersed in a polymer 515. Although not shown, a spacer for holding the distance between the electrode 501 and the counter electrode 503 at a predetermined interval is arranged in the liquid crystal layer 505.

The liquid crystal molecule 517 is a negative liquid crystal molecule. In a state where no electric field is generated between the electrode 501 and the counter electrode 503, the liquid crystal molecule 517 is vertically aligned by the alignment action of the vertical alignment films 509 and 513. Therefore, in the state where no electric field is generated between the electrode 501 and the counter electrode 503, the liquid crystal layer 505 transmits light.

On the other hand, in the case where the second driving voltage is applied to the electrode 501 selected based on the y-coordinate information among the plurality of electrodes 501, an electric field is generated between the selected electrode 501 and the counter electrode 503. When the electric field is generated between the electrode 501 and the counter electrode 503, the orientation of the liquid crystal molecule 517 becomes irregular. Therefore, when the electric field is generated between the electrode 501 and the counter electrode 503, the liquid crystal layer 505 scatters light. As a result, in a region corresponding to the electrode 501 to which the second driving voltage is applied, the light irradiated to the second light shielding panel 105b is not transmitted.

The case where the second light shielding panel 105b is a passive liquid crystal panel has been described above.

However, the present embodiment is not limited to this, and the second light shielding panel 105b may be an active-type liquid crystal panel.

In addition, the case where the second light shielding panel 105b has the PDLC configuration has been described above. However, the present embodiment is not limited to this, and the second light shielding panel 105b may be a polymer network liquid crystal (PNLC) panel in which liquid crystal molecules are dispersed in a three-dimensional network of polymers.

The configuration of the second light shielding panel 105b described with reference to FIG. 5 and FIG. 6 is similarly applied to the configuration of the first light shielding panel 105a. Further, the plurality of electrodes (first electrodes) arranged on the first light shielding panel 105a is arranged corresponding to the plurality of light emitting elements 701 arranged on a first light emitting unit 203a of the second sensor module 200 described later. In addition, in the first light shielding panel 105a, instead of the second driving voltage applied to the second light shielding panel 105b, the first driving voltage is applied to the electrode selected based on the x-coordinate information among the plurality of electrodes (first electrodes).

Figure 7:
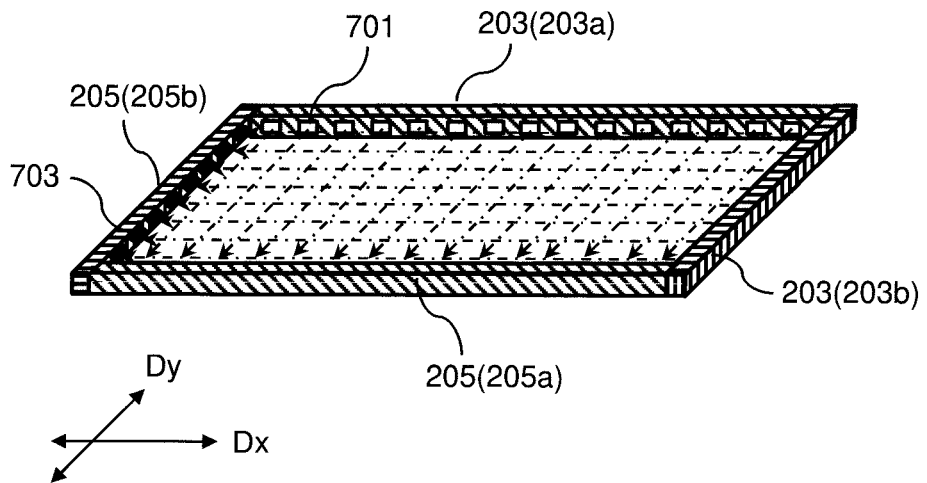
FIG. 7 is a perspective view showing an example of a configuration of a second sensor module according to an embodiment.
Figure 8:
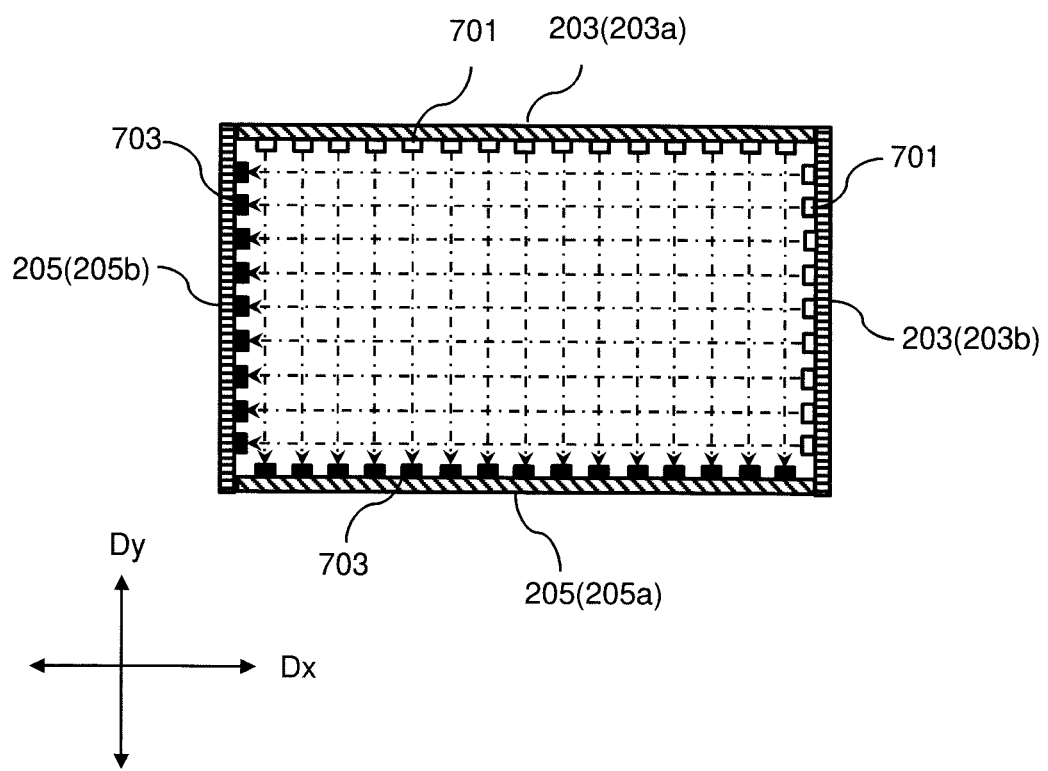
FIG. 8 is a plan view showing an example of a configuration of a second sensor module according to an embodiment.

Next, a configuration of the second sensor module 200 will be described with reference to FIG. 1, FIG. 7, and FIG. 8. FIG. 7 is a perspective view showing an example of the configuration of the second sensor module 200. FIG. 8 is a plan view showing an example of the configuration of the second sensor module 200.

As shown in FIG. 1, the second sensor module 200 includes a substrate 201, a light emitting unit 203, and a light-receiving unit 205. In FIG. 7 and FIG. 8, illustration of the substrate 201 is omitted.

The substrate 201 may be a glass substrate. In addition, the substrate 201 may be a glass film. However, the material of the substrate 201 is not limited to glass. For example, the substrate 201 may be composed of an insulating material capable of transmitting visible light, such as acrylic resin. Although the shape of the substrate 201 is not limited, the case where the substrate 201 has a rectangular shape having sides along the first direction Dx and the second direction Dy orthogonal to the first direction Dx will be described, for example.

The light emitting unit 203 is arranged on the substrate 201. The light emitting unit 203 includes the first light emitting unit 203a arranged along the first direction Dx and the second light emitting unit 203b arranged along the second direction Dy. Each of the first light emitting unit 203a and the second light emitting unit 203b includes the plurality of light emitting elements 701 that emits infrared light. The plurality of light emitting elements 701 of the first light emitting unit 203a is respectively arranged at predetermined intervals along the first directional Dx. The plurality of light emitting elements 701 of the second light emitting unit 203b is respectively arranged at predetermined intervals along the second directional Dy.

In addition, the light-receiving unit 205 is arranged on the substrate 201. The light-receiving unit 205 is arranged to face the light emitting unit 203. The light-receiving unit 205 includes a first light-receiving unit 205a arranged along the first direction Dx and a second light-receiving unit 205b arranged along the second direction Dy.

The first light-receiving unit 205a faces the first light emitting unit 203a. In the first light-receiving unit 205a, a plurality of light-receiving sensors 703 for detecting infrared light is respectively arranged at predetermined intervals along the first directional Dx. In the first light-receiving unit 205a, each of the plurality of light-receiving sensors 703 is arranged so as to correspond to each of the plurality of light emitting elements 701 arranged in the first light emitting unit 203a facing the first light-receiving unit 205a.

The second light-receiving unit 205b faces the second light emitting unit 203b. In the second light-receiving unit 205b, the plurality of light-receiving sensors 703 for detecting infrared light is respectively arranged at predetermined intervals along the second directional Dy. In the second light-receiving unit 205b, each of the plurality of light-receiving sensors 703 is arranged so as to correspond to each of the plurality of light emitting elements 701 arranged in the second light emitting unit 203b facing the second light-receiving unit 205b.

[Touch Panel Operation]

Figure 9:
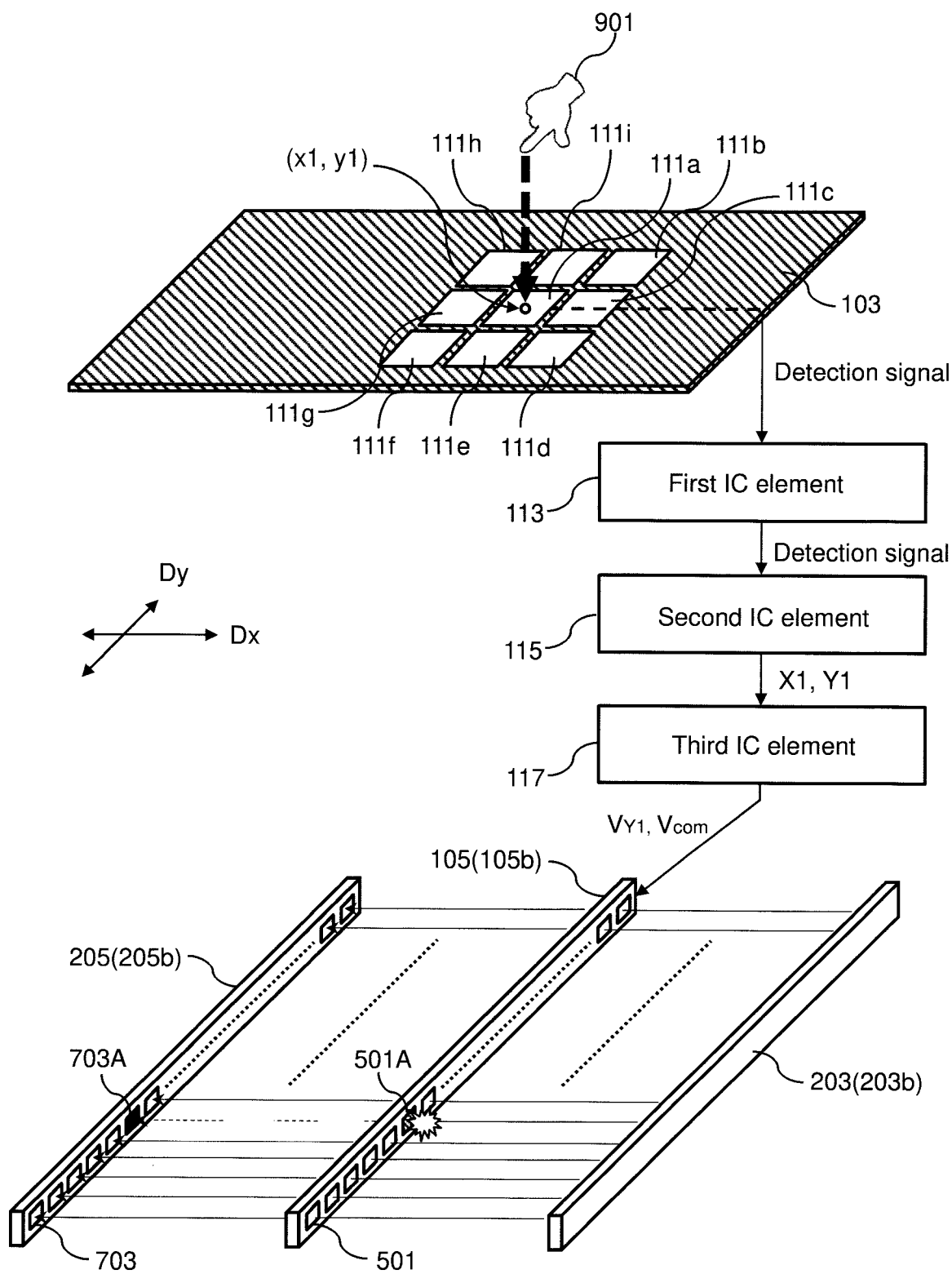
FIG. 9 is a schematic view for explaining an example of an operation of a touch panel according to an embodiment.

Next, an example of an operation of the touch panel 10 will be described with reference to FIG. 9. FIG. 9 is a schematic view for explaining the operation of the touch panel 10. In FIG. 9, only the second light shielding panel 105b is shown as the light shielding panel 105 of the first sensor module 100, and the first light shielding panel 105a is omitted. In addition, in FIG. 9, only the second light emitting unit 203b and the second light-receiving unit 205b are shown as the light emitting unit 203 and the light-receiving unit 205 of the second sensor module 200, and the first light emitting unit 203a and the first light-receiving unit 205a are not shown.

As shown in FIG. 9, the second light shielding panel 105b is arranged between the second light emitting unit 203b and the second light-receiving unit 205b of the second sensor module 200. More specifically, each light-receiving sensor 703 is arranged on an optical axis of each light emitting element 701 arranged along the second directional Dy, and the electrode (second electrode) 501 of the second light shielding panel 105b is positioned on each optical axis at a position between the light emitting element 701 and the light-receiving sensor 703. The same applies to the arrangement of the first light shielding panel 105a. Although not shown, the first light shielding panel 105a is arranged between the first light emitting unit 203a and the first light-receiving unit 205a of the second sensor module 200. That is, each light-receiving sensor 703 is arranged on the optical axis of each light emitting element 701 arranged along the first directional Dx, and the electrode (first electrode) of the first light shielding panel 105a is respectively positioned on each optical axis and between the light emitting element 701 and the light-receiving sensor 703. In addition, as shown in FIG. 1, the light shielding panel 105 (the first light shielding panel 105a and the second light shielding panel 105b) may be arranged adjacent to the light-receiving unit 205, or may be arranged adjacent to the light emitting unit 203.

When an object to be detected 901 is close to the non-contact sensor array 103 of the first sensor module 100, the capacitance of the electrode constituting a sensor 111a close to the object to be detected 901 and the electrodes (sensors 111b to 111i) around the sensor 111a changes. The sensor 111a and the sensors 111b to 111i around the sensor 111a output the detection signal according to the change in capacitance.

The detection signal is input to the first IC element 113 and adjusted by AFE. The adjusted detection signal is output to the second IC element 115. Based on the input detection signal, the control unit 300 of the second IC element 115 calculates coordinates by the operation unit 315 based on the change in capacitance from the sensors 111a to 111i that output the detection signal and the position of each sensor, and determines the position of the object to be detected 901 on xy coordinates. In this case, the determined position of the object to be detected 901 is referred to as (x1, y1). The control unit 300 generates coordinate information indicating the determined position (x1, y1) of the object to be detected 901 on xy coordinates. The coordinate information includes x-coordinate information X1 and y-coordinate information Y1. The generated coordinate information is output to the third IC element 117.

The coordinate information is input to the drive unit 400 of the third IC element 117. The drive control unit 407 selects the electrode to which the driving voltage is applied from the drive unit 400. Hereinafter, the case where the drive control unit 407 selects, based on the y-coordinate information Y1, an electrode 501A as at least one electrode corresponding to the y-coordinate information Y1, from the plurality of electrodes (second electrodes) 501 arranged on the second light shielding panel 105b will be described. In addition, based on the x-coordinate information X1, the drive control unit 407 selects at least one electrode corresponding to the x-coordinate information from among the plurality of electrodes (first electrodes) arranged on the first light shielding panel 105a.

Further, the drive unit 400 generates a driving voltage for driving the first light shielding panel 105a and the second light shielding panel 105b, and outputs the generated driving voltage to the selected electrodes based on the coordinate information (the x-coordinate information X1 and the y-coordinate information Y1). Specifically, the first driving circuit 401 generates a first driving voltage $V_{X1}$ for driving the first light shielding panel 105a and outputs the first driving voltage $V_{X1}$ to the selected electrode in the first light shielding panel 105a. In addition, the first driving circuit 401 outputs the same driving voltage as the third driving voltage $V_{com}$ applied to the counter electrode 503, which will be described later, to the other electrodes except for the selected electrode in the first light shielding panel 105a. That is, the potential difference between the other electrodes except for the selected electrode in the first light shielding panel 105a and the counter electrode is set to 0. As shown in FIG. 9, the second driving circuit 403 of the third IC element generates a second driving voltage $V_{Y1}$ for driving the second light shielding panel 105b and outputs the second driving voltage $V_{Y1}$ to the second light shielding panel 105b. In this case, the second driving circuit 403 outputs the second driving voltage $V_{Y1}$ to the electrode 501A. In addition, the second driving circuit 403 outputs the same driving voltage as the third driving voltage $V_{com}$ applied to the counter electrode 503, which will be described later, to the other electrodes 501 except for the electrode 501A in the second light shielding panel 105b. That is, the potential difference between the other electrodes 501 and the counter electrode 503 except for the selected electrode 501A in the second light shielding panel 105b is set to 0.

The third driving circuit 405 generates a third driving voltage $V_{com}$ for driving the first light shielding panel 105a and the second light shielding panel 105b, and outputs the third driving voltage $V_{com}$ to the counter electrode in the first light shielding panel 105a and the counter electrode in the second light shielding panel 105b. The third driving voltage $V_{com}$ may be an AC voltage having a predetermined period or a DC voltage having a predetermined fixed potential.

When the second driving voltage $V_{Y1}$ is applied to the electrode 501A, an electric field is generated between the electrode 501A and the counter electrode (second counter electrode) 503 (not shown in FIG. 9) to which the third driving voltage $V_{com}$ is applied. Then, the infrared light does not transmit through in a region corresponding to the electrode 501A of the second light shielding panel 105b because the infrared light irradiated from the second light emitting unit 203b is scattered in the region of the second light shielding panel 105b. As a result, a light-receiving sensor 703A corresponding to the electrode 501A cannot detect the infrared light emitted from the corresponding light emitting element 701.

Although not shown, in the first light shielding panel 105a, similarly, when the first driving voltage $V_{X1}$ is applied to the electrode (first electrode) selected based on the x-coordinate information X1, an electric field is generated between the selected electrode and the counter electrode (first counter electrode) to which the third driving voltage $V_{com}$ is applied. Then, the infrared light does not transmit through the first light shielding panel 105a in the region corresponding to the electrode to which the first driving voltage $V_{X1}$ is applied because the infrared light emitted from the first light emitting unit 203a is scattered in the region. As a result, the light-receiving sensor corresponding to the electrode to which the first driving voltage $V_{X1}$ is applied cannot detect the infrared light emitted from the corresponding light emitting element.

In the case of operating a conventional infrared (IR) touch panel, it is necessary to directly touch the touch panel (screen) with a finger or the like to block the infrared light. However, in the present embodiment, infrared light corresponding to the position (x1, y1) on xy coordinates, which is the position of the object to be detected 901 close to the non-contact sensor array 103, in the second sensor module 200 is blocked by the first light shielding panel 105a and the second light shielding panel 105b of the first sensor module 100. Therefore, unlike the conventional infrared (IR) touch panel, the second sensor module can be operated only by bringing a finger close to the non-contact sensor array 103 of the first sensor module 100 without directly touching the touch panel. Therefore, it is possible to reduce the possibility of occurrence of contact infection of bacteria, viruses, or the like through the touch panel.

In addition, in the case where the existing IR touch panel applied to an ATM, an automatic payment machine, a ticket vending machine, and the like, is such that a plurality of infrared light sources is arranged side by side in a direction X and a direction Y as in the second sensor module, the sensor configuration of the above embodiment can be realized only by installing the first sensor module 100 of the present embodiment in front of the light source and connecting the units related to the driving control to each other, and there is no need to replace the existing system or change the device itself constituting the display unit. Therefore, the first sensor module 100 of the present embodiment can be applied to the existing system, and a non-contact touch panel can be easily realized.

The addition, deletion, or design change of components, or the addition, deletion, or condition change of process as appropriate by those skilled in the art based on the embodiment are also included in the scope of the present invention as long as they are provided with the gist of the present invention.

Further, it is understood that, even if the effect is different from those provided by each of the above-described embodiments, the effect obvious from the description in the specification or easily predicted by persons ordinarily skilled in the art is apparently derived from the present invention.

What is claimed is:

1. A sensor module comprising:
   a non-contact sensor array having a plurality of sensors;

a control unit configured to receive a detection signal output from the non-contact sensor array and to generate coordinate information based on the detection signal;
a drive unit configured to receive the coordinate information from the control unit and to output a drive signal based on the coordinate information; and
a light shielding panel overlapping the non-contact sensor array, the light shielding panel configured to be driven based on the drive signal,
wherein the light shielding panel is switchable between blocking and transmitting light traveling in a direction parallel to a main surface of the non-contact sensor array.

2. The sensor module according to claim 1, wherein
the coordinate information includes first coordinate information indicating a coordinate in a first direction and second coordinate information indicating a coordinate in a second direction different from the first direction,
the drive signal includes a first drive signal based on the first coordinate information and a second drive signal based on the second coordinate information.

3. The sensor module according to claim 2, wherein the light shielding panel includes a first light shielding panel arranged along the first direction and driven based on the first drive signal, and a second light shielding panel arranged along the second direction and driven based on the second drive signal.

4. The sensor module according to claim 3, wherein
the first light shielding panel has a plurality of first electrodes arranged along the first direction,
the first drive signal is applied to at least one of the plurality of first electrodes selected based on the first coordinate information,
the second light shielding panel has a plurality of second electrodes arranged along the second direction, and
the second drive signal is applied to at least one of the plurality of second electrodes selected based on the second coordinate information.

5. The sensor module according to claim 4, wherein
the first light shielding panel has a first counter electrode facing the plurality of first electrodes and a polymer dispersed liquid crystal arranged between the plurality of first electrodes and the first counter electrode,
the second light shielding panel has a second counter electrode facing the plurality of second electrodes, and a polymer dispersed liquid crystal arranged between the plurality of second electrodes and the second counter electrode,
the first light shielding panel becomes opaque in a region corresponding to the first electrode to which the first drive signal is applied, and
the second light shielding panel becomes opaque in a region corresponding to the second electrode to which the second drive signal is applied.

6. The sensor module according to claim 1, wherein
each of the plurality of sensors includes an electrode whose capacitance changes in response to an approach of a conductor, and
the detection signal is a signal indicating a change in capacitance of the electrode or a magnitude of the capacitance of the electrode.

7. A touch panel comprising:
a first sensor module, the first sensor module including a non-contact sensor array having a plurality of sensors, a control unit configured to receive a detection signal output from the non-contact sensor array and to generate coordinate information based on the detection signal, a drive unit configured to receive the coordinate information from the control unit and to output a drive signal based on the coordinate information, and a light shielding panel configured to be driven based on the drive signal; and
a second sensor module arranged adjacent to the first sensor module, the second sensor module including a substrate, a light emitting unit arranged on the substrate, and a light receiving unit arranged on the substrate and facing the light emitting unit,
wherein the light shielding panel of the first sensor module is arranged between the light emitting unit and the light receiving unit of the second sensor module.

8. The touch panel according to claim 7, wherein
the light emitting unit includes a light emitting element emitting infrared light, and
the light receiving unit includes a light receiving sensor receiving the infrared light from the light emitting element.

9. The touch panel according to claim 8, wherein
the coordinate information includes first coordinate information indicating a coordinate in a first direction and second coordinate information indicating a coordinate in a second direction different from the first direction, and
the drive signal includes a first drive signal based on the first coordinate information and a second drive signal based on the second coordinate information.

10. The touch panel according to claim 9, wherein
the light shielding panel includes a first light shielding panel arranged along the first direction and driven based on the first drive signal, and a second light shielding panel arranged along the second direction and driven based on the second drive signal,
the light emitting unit includes a first light emitting unit arranged along the first direction and a second light remitting unit arranged along the second direction,
the light receiving unit includes a first light receiving unit facing the first light emitting unit and a second light receiving unit facing the second light receiving unit,
the first light shielding panel is arranged between the first light emitting unit and the first light receiving unit, and
the second light shielding panel is arranged between the second light emitting unit and the second light receiving unit.

11. The touch panel according to claim 10, wherein
the first light shielding panel has a plurality of first electrodes arranged along the first direction, each first electrode is arranged between the light emitting element of the first light emitting unit and the light receiving sensor of the first light receiving unit and on an optical axis of the light emitting element of the first light emitting unit,
the first drive signal is applied to at least one of the plurality of first electrodes based on the first coordinate information,
the second light shielding panel has a plurality of second electrodes arranged along the second direction, each second electrode is arranged between the light emitting element of the second light emitting unit and the light receiving sensor of the second light receiving unit and on the optical axis of the light emitting element of the second light emitting unit, and
the second drive signal is applied to at least one of the plurality of second electrodes based on the second coordinate information.

12. The touch panel according to claim 11, wherein
the first light shielding panel has a first counter electrode facing the plurality of first electrodes and a polymer dispersed liquid crystal arranged between the plurality of first electrodes and the first counter electrode,
the second light shielding panel has a second counter electrode facing the plurality of second electrodes, and a polymer dispersed liquid crystal arranged between the plurality of second electrodes and the second counter electrode,
the first light shielding panel becomes opaque in a region corresponding to the first electrode to which the first drive signal is applied, and
the second light shielding panel becomes opaque in a region corresponding to the second electrode to which the second drive signal is applied.

13. The touch panel according to claim 7, wherein
each of the plurality of sensors includes an electrode whose capacitance changes in response to an approach of a conductor, and
the detection signal is a signal indicating a change in capacitance of the electrode or a magnitude of the capacitance of the electrode.

14. A touch panel comprising:
a first sensor module, the first sensor module including a non-contact sensor array having a plurality of sensors, and a first light shielding panel overlapping the non-contact sensor array and switchable between blocking and transmitting a first light traveling in a direction parallel to a main surface of the non-contact sensor array; and
a second sensor module arranged adjacent to the first sensor module, the second sensor module including a substrate, a first light emitting unit arranged on the substrate, and a first light receiving unit arranged on the substrate and facing the first light emitting unit,
wherein the first light shielding panel is arranged between the first light emitting unit and the first light receiving unit of the second sensor module.

15. The touch panel according to claim 14, wherein
the first light emitting unit emits light that intersects in a plan view with a detection position detected by the non-contact sensor array.

16. The touch panel according to claim 14, wherein the first light is infrared light.

17. The touch panel according to claim 14, further comprising:
a second light shielding panel overlapping the non-contact sensor array;
a second light emitting unit equipped by the second sensor module; and
a second light receiving unit equipped by the second sensor module,
wherein
the first light travels in a first direction, and
the second light shielding panel is located between the second light emitting unit and the second light receiving unit and is switchable between blocking and transmitting a second light traveling in a second direction, which intersects the first direction.

18. The touch panel according to claim 17, wherein
the first light emitting unit emits the first light that intersects in a plan view with a detection position detected by the non-contact sensor array, and
the second light emitting unit emits the second light that intersects in a plan view with the detection position detected by the non-contact sensor array.

* * * * *